April 8, 1930.  A. C. HOECKER  1,753,515

VALVE AND HEAD FOR GAS ENGINES

Filed Dec. 1, 1926  2 Sheets-Sheet 1

INVENTOR:
Albert C. Hoecker

April 8, 1930. A. C. HOECKER 1,753,515
VALVE AND HEAD FOR GAS ENGINES
Filed Dec. 1, 1926 2 Sheets-Sheet 2
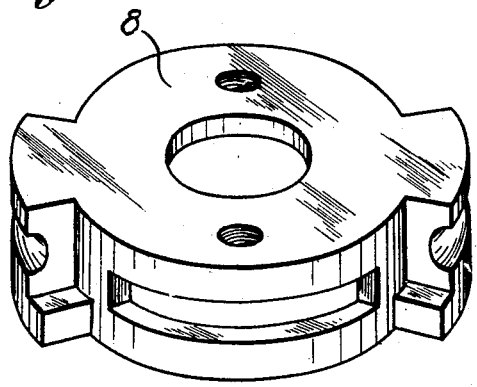
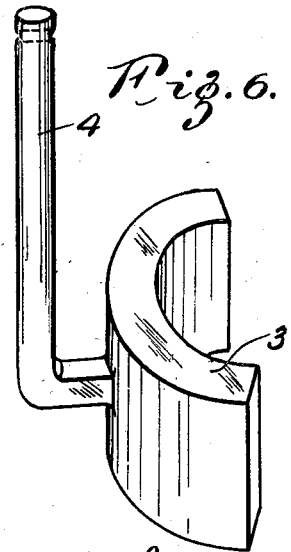
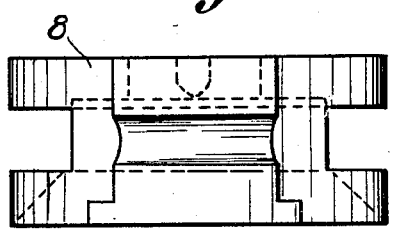
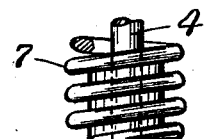
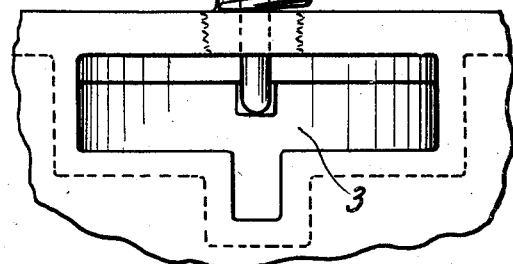
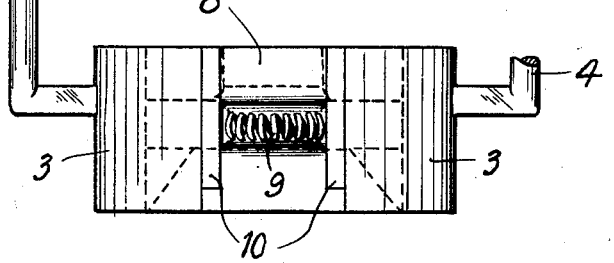
INVENTOR:
Albert C. Hoecker.

Patented Apr. 8, 1930

1,753,515

UNITED STATES PATENT OFFICE

ALBERT C. HOECKER, OF ST. LOUIS, MISSOURI

VALVE AND HEAD FOR GAS ENGINES

Application filed December 1, 1926. Serial No. 151,936.

My invention relates to improvements in gas engine valves and cylinder heads and the main object of the invention is to provide a cylinder head with inlet and exhaust ports, a reciprocating slide valve for each of said ports, each valve comprising a cylindrical segment, a valve stem connected to each of the valves the stem extending through the ports, and through the head of the cylinder.

Another object of the invention is to provide means which will hold the valves against the seats so that the valves will be practically self-grinding and at the same time prevent leakage between the valve and seat.

Another object of the invention is to place the valve stems in the ports or free from the interior of the cylinder, thus eliminating leakage of the compression charge past the valve stem.

Another object is to so construct the valves and stems so that the valves may be operated with the usual overhead valve gearing such as is employed in Buick or other cars.

Further objects and advantages of the invention will be set forth in the detailed description which follows.

In the accompanying drawings:

Fig. 3 is a perspective view of the removable assembly head which acts as a guide for the valves.

Fig. 4 is a side view of Fig. 3.

Fig. 5 is a side view of the assembly head with valves bearing plates and springs assembled.

Fig. 6 is a view of one of the valves.

Fig. 7 is a sectional view of one of the ports and valve looking through the ports.

Like numerals designate corresponding parts throughout the several figures of the drawings.

Figure 1:
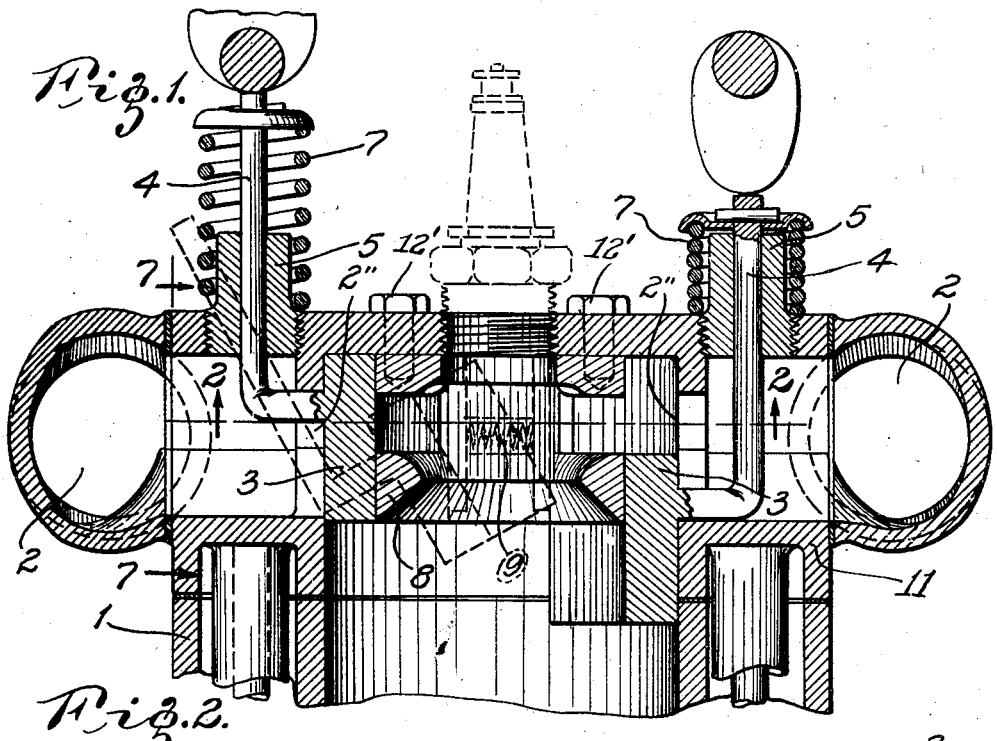
Fig. 1 is a fragmentary vertical central section through the cylinder of an engine constructed in accordance with my invention.

In the drawings, 1 is the cylinder, and the head 11 has ports 2″—2″ cut circumferentially around and through the wall thereof, which are in communication with manifolds 2—2. Directly over these ports there are two cylindrical segmental sliding valves 3—3. Each of these valves has a valve stem 4 welded or otherwise secured thereto. These stems 4—4 extend through the inlet and exhaust ports and through the head and valve guides 5—5. Over the guides and valve stems there are two springs 7—7. At the top of the valve stem there is an opening for the reception of a pin or key. Below the openings is a washer. The springs, key and washer hold the valves closed while the charge is under compression. In the center of the valves is an assembly head 8 circumferentially around the head and between the valves are two coiled springs 9—9 and four bearing plates 10. These spring bearing plates and head hold the valves firmly against the ports 2″—2″. The head 8 is detachable and bolted to the cylinder head.

Figure 2:
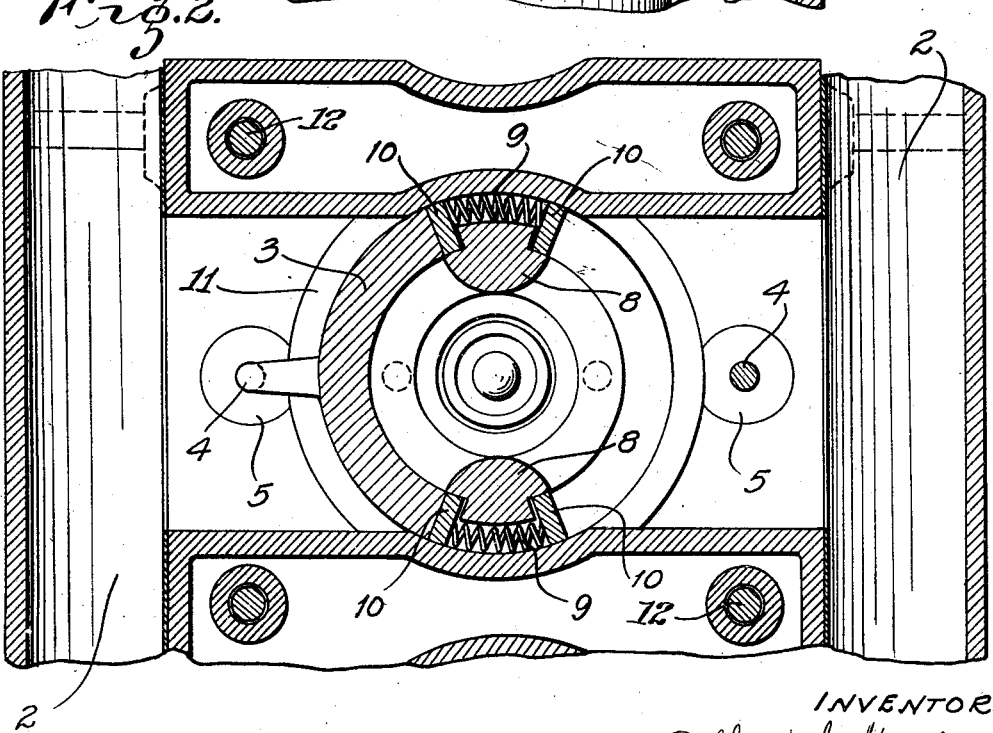
Fig. 2 is a fragmentary horizontal section on line 2—2 in Fig. 1, looking in the direction of the arrows.

In placing the valve in the head the valve stem guides 5—5 are screwed out of the threaded socket, the valves are then placed in the head as shown in the dotted lines Fig. 1. After the valves are lined parallel with the walls of the cylinder or head and the guides 5 are screwed in the sockets, the springs are then placed over the guides 5—5 and over the stem; a washer is then placed over the stem; and over the springs; a key is then placed through the stem which will hold the valve in operating position. To hold the valves against the valve seats, I provide a cylindrical head as shown in Figs. 3—4—5. The head has two circular grooves. In these grooves are two coiled springs 9—9. Longitudinally with the head and at the ends of the springs there are four bearing plates 10, that is, there are two bearing plates at each side of the head as shown in Fig. 2. The plates 10 are held in the head as shown in Fig. 5. These plates act as guides for the valves at the same time as the springs 9—9 bear against the plates 10. There will be a certain amount of pressure on the longitudinal end of the valves. The pressure of the plates and springs will always cause the valve to be firmly seated. The head 8 also acts as an assembly head for the springs and plates 10. It also acts as a guide for the valve. The head 8 has an opening on each side as shown in Fig. 3 and Fig. 4. These openings are for intake and exhaust and are lined with the intake and exhaust ports of the cylinder head.

In assembling the head and valves the valves are first placed in the cylinder head as shown in Fig. 1. The valve is started through the ports as shown in the dotted lines. The springs 9 and plates 10 are placed in the assembly head 8. The head 8, plates 10, and springs 9 are then placed in the center of the valves. The openings of the assembly head 8 are lined with the ports in the cylinder head. The complete assembly head is then bolted to the cylinder head 11 by bolts 12—12 as shown in Fig. 1.

It will not be necessary to explain the operation of the valves as the valves reciprocate or operate the same as the usual poppet valves. However, as an illustration, Fig. 1 shows one valve open while the other valve is closed.

What I claim is:

1. In a gas engine comprising a clyinder with a cylindrical head provided with inlet and exhaust ports, a cylindrical, segmental valve for each of said ports, said valves having a stem permanently attached thereto and said valves being of less circumference than the circumference of the inside of the cylinder so that while the stem and valve may be in one piece the stem may be inserted into operative position through the ports and through the head substantially as described.

2. In an engine comprising a cylinder head having inlet and exhaust ports; a reciprocating slide valve for each of said ports, said valves having a valve stem connected to each of said valves, said stems extending through the ports and free of the interior of the cylinder so that the compression charge will not escape past the valve stems.

3. In a reciprocating engine comprising a cylindrical cylinder head having intake or exhaust ports in said head, and a cylindrical segmental valve for opening and closing said ports said valve having a stem attached thereto, said stem extending through the ports and through a guide in the head of said engine, said guide being in one piece and completely surrounding said valve stem.

4. In a reciprocating engine comprising a cylinder head having inlet or exhaust ports and a segmental reciprocating slide valve adapted to open and close said ports and operate on the interior of the cylinder head, said valves having stems permanently connected thereto at right angles, said valve stems passing through a one piece circumferential guide in the head of said engine.

5. In an engine comprising a cylinder having intake and exhaust ports in the walls thereof; a sectional cylindrical valve adapted to open and close said ports, each of said valves having a stem connected thereto, said stems extending through the head of the cylinder and a guide secured to the interior of the head of the cylinder for holding the valves against the ports substantially as described.

ALBERT C. HOECKER.